UNITED STATES PATENT OFFICE.

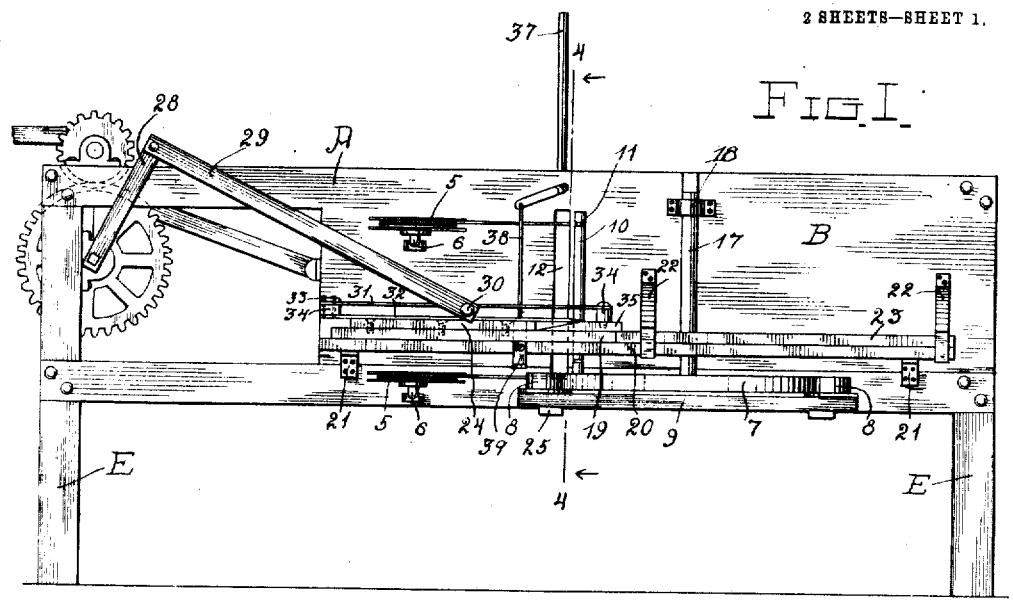
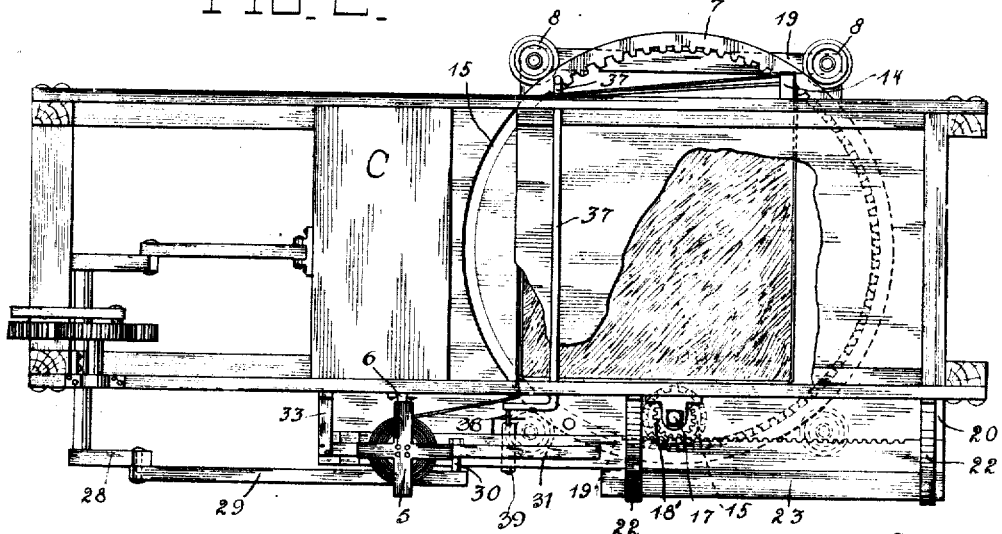

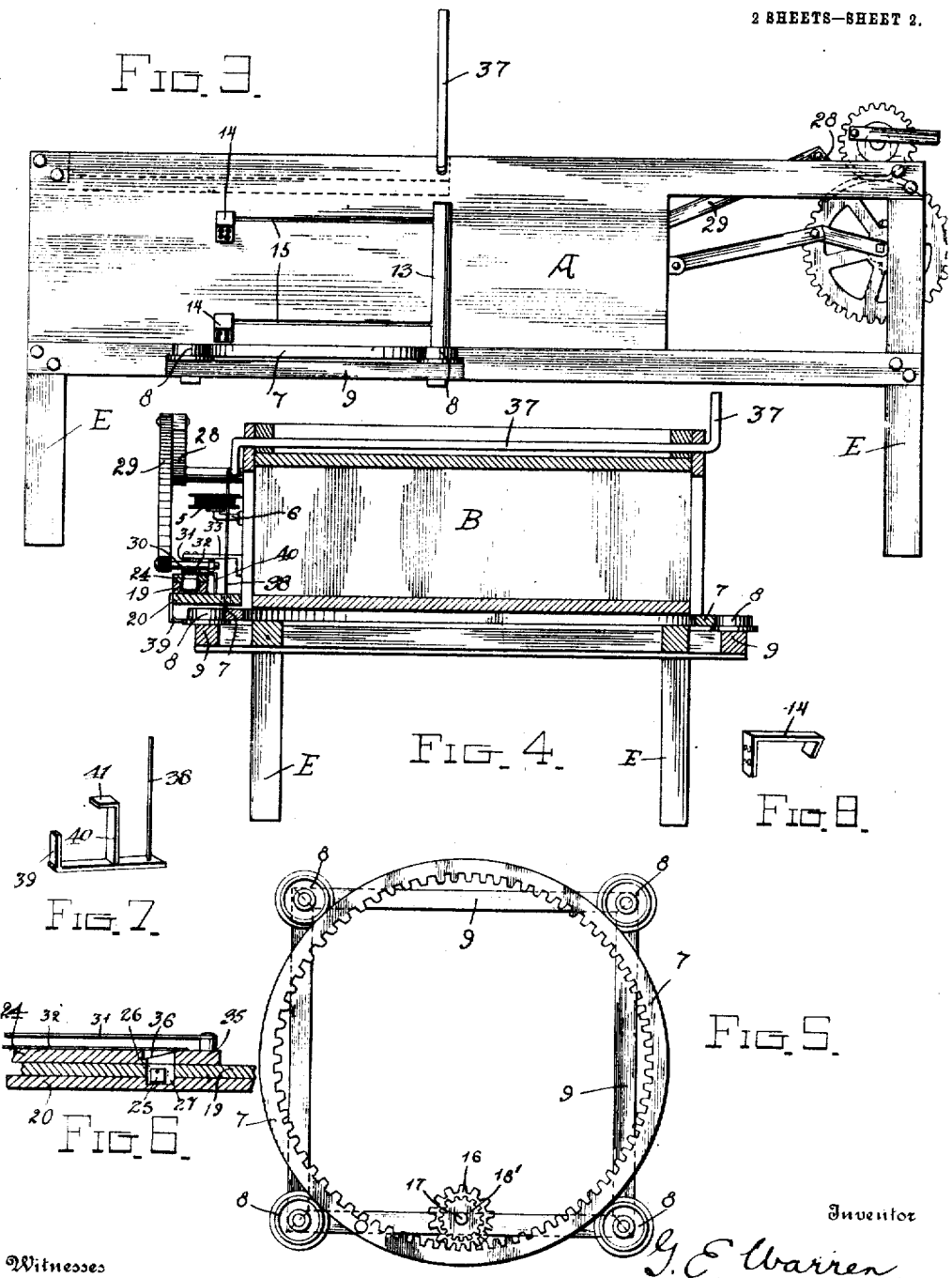

GLEN E. WARREN, OF HARTFORD, MICHIGAN.

HAY-PRESS.

No. 909,974.    Specification of Letters Patent.    Patented Jan. 19, 1909.

Application filed December 23, 1907. Serial No. 407,805.

*To all whom it may concern:*

Be it known that I, GLEN E. WARREN, a citizen of the United States, residing at Hartford, in the county of Van Buren and State of Michigan, have invented certain new and useful Improvements in Hay-Presses, of which the following is a specification.

This invention relates to binding attachments for presses whereby any number of wires may be bound or tied around the compressed bales of cotton, straw, excelsior or like material formed in the compressor, and consists of certain novel features of construction, combination and arrangement of parts, as will be hereinafter described and claimed.

In the accompanying drawings forming a part of this specification and in which like numerals designate like parts throughout the several views, Figure 1 is a side elevation of a hay press fitted with my improved binding mechanism, Fig. 2 is a plan view thereof, partly broken away, Fig. 3 is an elevation of the opposite side to that illustrated in Fig. 1, Fig. 4 is a vertical section, taken on the line 4—4 of Fig. 1, Fig. 5 is a detail plan view of parts to be hereinafter specifically described, Fig. 6 is a fragmental sectional view of parts to be hereinafter specifically described, Fig. 7 is a perspective view of the lower portion of the operating lever, and Fig. 8 is a perspective view of one of the wire end holders.

In the practical embodiment of this invention, my attachment is secured to a press A, of any desired construction, but preferably formed with a baling chamber B in which a plunger C is reciprocated by means of a pitman and crank-rod secured to a suitable driving wheel, the whole being supported upon suitable standards E.

The wires, used in tying the bales, are wound upon spools 5 which are supported in position upon brackets 6 placed on one side of the press A. Any desired number of these wires may be employed for binding bales of varied sizes, the corresponding number of brackets and spools being placed one below the other on the same side of the press and spaced apart.

The wire-carrying mechanism consists of a rotatable internally toothed ring 7 held in position by guide wheels 8 at the four corners of a supporting frame 9 secured below the baling chamber B. Upon this ring 7 is mounted an upright pin 10 grooved as at 11, to receive the wires from the spools 5 and by the rotation of ring 7, to carry them through vertical slots 12 and 13 cut opposite each other in both sides of the baling-chamber B, the wires catching automatically upon suitable holders 14 on the far side of the press where they are held upon the return of pin 10 to its original position, the slots 15 being cut in the bottom and side of the press to allow free movement of said pin wires. Meshing with the internally-toothed ring 7 is a pinion 16 (see Fig. 5) keyed on a vertical shaft 17 which is supported upon the side of the baling-chamber by the bracket 18 which shaft is squared at its upper end to receive a crank or lever. Keyed upon this shaft 17 above pinion 16 is a smaller pinion 18′ which may be rotated by the movement of a rack-bar 19 engaging therewith, said rack-bar being adapted to reciprocate upon a platform 20 supported upon the side of the press by a plurality of brackets 21 and braces 22. A guide bar 23 likewise supported by braces 22 prevents lateral movement of said rack bar. A block or strip 24 is secured to the upper surface of rack bar 19 a short distance from its extremity and a small block 25 is eccentrically mounted in a central opening 26 cut through said rack-bar, said block 25 resting in a recess 27 in the platform 20 when said rack-bar is not in motion, as will be hereinafter further explained.

Attached to the shaft of the drive-wheel employed in operating the compressor mechanism is a crank-rod 28 to which is pivotally secured a pitman 29, said pitman being guided in its movements by a wrist-pin 30 at its opposite end reciprocating between metallic guide bars 31 and 32. These guide bars are fastened at one end to a bracket 33 extending out from the side of the press and are spaced apart from each other by suitable thimbles 34, the upper guide bars 31 being secured at its opposite end to a block 35 formed with an inclined portion 36 and resting lightly upon rack bar 19. The lower guide bar 32 is shorter than the upper bar 31 and rests upon the strip 24 and the block 35, from which position it may be raised by throwing the lever 37 forward, the motion being transmitted from the handle of the lever through the vertical rod 38, the angular bar 39 and the angular bar 40 secured midway said bar 39, the bent portion 41 resting directly beneath the guide bar 32.

The operation of the device is as follows: The material, hay, straw, excelsior, etc., is compressed by the plunger C actuated by suitable driving mechanism and is retained in the baling chamber B awaiting the formation of a second bale which will push out the first bale in the well known manner. On starting the press the wires used in tying the bales are brought from spools 5 through slots 12 and 13 and secured upon holders 14. Th bale in forming will then come in contact with the wires and as they are free at one end, but fast at the other the wires will follow the contour of the bale, as shown in Fig. 2. When a bale is formed of the size desired the handle of the lever 37 is moved and by its connecting rods raises the lower metallic guide bar 32, so that the wrist pin 30 upon pitman 29, which has previously been idly reciprocating between guide bars 31 and 32, is allowed to descend the inclined portion 36 of block 35 and come in contact with the strip 24 upon rack bar 19, thus reciprocating the rack bar. Upon the movement of the rack bar 19 the small block 25 is pulled out of the recess 27 and by its eccentric mounting is raised upon the surface of rack bar 19, thus affording a contact piece for the wrist pin 30 to return said rack bar to its original position. The block 25 drops by gravity into recess 27 when directly above the same on its return and allows wrist pin 30 to ascend the inclined portion and reënter the space between the guide bars. The forward movement of rack bar 19 will revolve pinion 18' with which it meshes, and revolving with said pinion 18', shaft 17 and pinion 16 will rotate the internally toothed ring 7, said ring carrying the upright pin 10 which, engaging the wires from spools 5, will carry them in a double line (see Fig. 2) across the front of the bale formed in the baling chamber the wires being caught automatically by the holders 14, while the pin 10 and the ring 7 are returned to their original position as the rack bar 19 makes its backward movement. The wires now encircle the bale and are removed from the holders and tied by the operator. Since the wires are carried to the holders in a double line, it is evident that when cut one length they will secure the bale in the baling chamber while the other will be in readiness to bind the subsequently formed bale.

While the elements employed are well adapted to serve the functions specified, it is evident that minor changes may be made in the construction, arrangement and combination of parts without departing from the spirit and scope of this invention as set forth in the appended claims.

Having described my invention, I claim:

1. The combination, with a baling-press, of a wire-binding device, comprising a rotatable ring provided with a wire-carrying pin grooved to receive a plurality of wires, means actuated by the compressing mechanism for rotating said ring and means for throwing said first named means in and out of operation, substantially as described.

2. The combination, with a baling-press, of a binding device comprising a rotatable internally-toothed ring mounted to rotate about the bale and provided with an upright wire-carrying pin grooved to receive a plurality of wires, a rotatable shaft, a pair of pinions keyed thereon, one of said pinions engaging said ring, a reciprocatory rack-bar engaging the other of said pinions, and means for connecting said rack-bar with a portion of the operating mechanism of said baling press, substantially as described.

In testimony whereof I affix my signature in presence of two witnesses.

GLEN E. WARREN.

Witnesses:
H. J. MERRIMAN,
C. E. ANDERSON.